United States Patent [19]
Peiffer et al.

[11] Patent Number: 5,095,073
[45] Date of Patent: Mar. 10, 1992

[54] WATER SOLUBLE RIGID ROD SULFONATED AROMATIC POLYAMIDE

[75] Inventors: Dennis G. Peiffer, East Brunswick; Jeff J. Kaladas, South Bound Brook, both of N.J.

[73] Assignee: Exxon Research and Engineering Company, Florham Park, N.J.

[21] Appl. No.: 487,099

[22] Filed: Mar. 2, 1990

[51] Int. Cl.⁵ .................................. C08G 69/48
[52] U.S. Cl. ...................... 525/420; 524/606; 524/608; 528/337
[58] Field of Search .......... 525/420; 528/337; 524/606, 607, 608

[56] References Cited
U.S. PATENT DOCUMENTS
4,894,422  1/1990  Peiffer et al. ............... 528/337

Primary Examiner—Harold D. Anderson
Attorney, Agent, or Firm—Richard E. Nanfeldt; Joseph J. Dvorak

[57] ABSTRACT

A water soluble and brine soluble rod-like polymer having recurring any units of the formula:

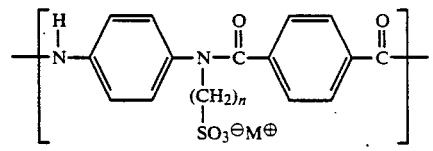

wherein n is a 2 to 22 straight chained or branched chained alkyl or cycloalkyl group and the level of sulfonation is about 20 to about 100 mole %, and M is a tertiary amine or a metal cation selected from the group consisting of aluminum, iron, lead, Groups IA, IIA, IB and IIB of the Periodic Table of Elements.

12 Claims, 9 Drawing Sheets

WATER SOLUBLE RIGID ROD SULFONATED AROMATIC POLYAMIDE

FIELD OF THE INVENTION

The present invention describes the synthesis of a novel family of sulfonate-containing rigid rods. These copolymer form aqueous solutions that possess markedly different rheological properties than conventional water soluble random coil polymers.

BACKGROUND OF THE INVENTION

It is well known that flexible polymer chains are generally considered useful as viscosification agents when dissolved in the appropriate solvent system. The major reason for this viscosity enhancement is due to the very large dimensions of the individual polymer chain as compared to the dimension of the single solvent molecules. Any increase in the size of the polymer chain will produce a corresponding enhancement in the viscosity of the solution. This effect is maximized when the polymer is dissolved in a "good" solvent. Therefore, in general, a soluble polymer is useful for thickening solvents, while a water soluble polymer is appropriate for increasing the viscosity of aqueous systems. With regard to aqueous solution, solvent soluble nonionic polymers and high charge density sulfonate or carboxylate polyelectrolytes are quite useful in this regard and are commonly used materials. However, the solution properties of the former family of material are controlled primarily through modification of the molecular weight of the polymer and through changes in the level of dissolved polymer. These materials become especially effective at concentrations where the individual polymer chains begin to overlap. This "transition" is commonly referred to in the literature as the chain overlap concentration or simply C*. It should be noted that in most nonionic polymers of commercial interest, a relatively large amount of polymer is required prior to reaching C*. Therefore, this approach is undesirable from a economic viewpoint. Moreover, the rheological properties of many of these nonionic systems have been published. The results of these studies show that, in general, these solutions are shear thinning over all shear rates investigated.

Polyelectrolytes, on the other hand, are very useful and the most commonly used materials. However, the solution properties of these materials begin to deteriorate as low molecular additives (i.e., acids, bases or salts) are dissolved in the solution. These additives screen the charges that are fixed along the chain backbone which results in a decrease in the dimensions of the polymer molecule. The viscosity diminishes as long as the chain continue to shrink.

It has been found previously (U.S. Pat. Nos. 4,460,758 and 4,540,496), for example, that intrapolymer complexes, composed of a nonstoichometric ratio of cationic and anionic monomeric units, can be useful in viscosifying aqueous solutions systems (as required in a variety of well control and workover fluids; i.e., water based drilling fluids and acid gellation systems). More importantly, these polymeric materials possess higher viscosity in acid, base or salt solution than in the corresponding fresh water system. Even more interesting is the observation that these polymeric materials show a corresponding viscosity enhancement as the concentration of the dissolved acid, base or salt is increased, even though the polyampholyte contains a substantial amount of dissociable charge. As explained earlier, these viscosity results are unexpected since the general tendency of charged macromolecules in these types of aqueous solutions shows a marked decrease in thickening efficiency.

Furthermore, in recent years, interpolymer complexes have received considerable attention in the literature due to their interesting and unique properties. In most instances, these complexes are formed by intimately mixing aqueous solutions containing high-charge density polyelectrolytes possessing opposite charge. When these polymer molecules meet in solution, the interaction between oppositely charged sites will cause the release of their associated counterions forming the complexes. The counterions are now free to diffuse into the bulk solution. Normally, phase separation occurs upon prolonged standing in these higher-charged density complexes. As a result, these materials have poor viscosification properties. In previous U.S. patents, it is reported that low-charge interpolymer complexes are soluble and effective in viscosifying aqueous solution systems. More importantly, these complexes possess a substantially higher viscosity than the corresponding individual low-charge density copolymer components. As detailed earlier, these characteristics are unexpected since high-charge density complexes are insoluble in these conventional solution systems.

Even more interesting is the unique and unexpected result that these soluble interpolymer complexes are capable of enhancing the viscosity of aqueous solutions under relatively broad shear conditions. When these unique polymeric materials, dilatant behavior occurs in aqueous fluids which are of extreme technological utility. It is further noted that under the identical experimental conditions, the viscosity of the individual copolymer components show the normal shear thinning behavior. In all of the above instances, the chain conformation can be approximated as a random coil.

The instant invention teaches the finding that a novel family of water soluble rod-like polymers are useful in thickening fresh and high brine solutions even under shear. In addition, these polymeric materials have markedly improved and unique solution properties, especially at high ionic strengths, as compared to conventional water soluble polymers.

These copolymers are based on, but not limited to the incorporation of the above anionic, i.e., sulfonate groups, into a rigid or semiflexible polyamide backbone structure.

It should be noted at this point that the use of hydrophobic groups on flexible water soluble polymers to enhance the rheological properties of water based fluids has been described. One approach to provide polyacrylamide based systems containing hydrophobic groups is described in Bock, et al, U.S. Pat. No. 4,520,182 and 4,528,348. Water soluble acrylamide copolymers containing a small amount of oil soluble or hydrophobic alkylacrylamide groups were found to impart efficient viscosification to aqueous fluids. Landoll, U.S. Pat. No. 4,304,902, describes copolymers of ethylene oxide with long chain epoxides which also required relatively large polymer concentration (approximately 1%) for thickening water and required surfactants for solubility due to irregularities in the polymerization. In a related case, U.S. Pat. No. 4,428,277, modified nonionic cellulose ether polymers are described. Although these polymers show enhanced hydrophobic groups, the viscosification efficiency was very low, requiring 2 to 3 weight percent polymer to provide an enhancement. The use of surfactants to enable solubility and, in turn, viscosification, by a water soluble polymer containing hydrophobic groups is described in Evani, U.S. Pat. No. 4,432,881. The hydrophobic groups claimed are attached to the polymer via an acrylate linkage which is known to have poor hydrophobic stability. In addition, the need for a surfactant to achieve solubility and thickening efficiency should made such system very salt sensitive, as well as very sensitive to small changes in surfactant and polymer concentrations. Emmons, et al., U.S. Pat. No. 4,395,524, teaches acrylamide copolymers as thickeners for aqueous systems. While these polymers possess hydrophobic groups they are prepared using alcohol containing solvent which are known chain transfer agents. The resulting polymers have rather low molecular weights and, thus, relatively high polymer concentrations are required to achieve reasonable viscosification of water based fluids. These water soluble polymers again are best described as random coils.

SUMMARY OF THE INVENTION

The present invention teaches a process for producing water soluble rigid-rod polymers that are efficient viscosifiers for a fresh and high ionic strength aqueous solutions. The process relies on the complete solubilization of the initial starting material which is of itself not water soluble. The synthesis occurs in a solvent environment in which the reaction also takes place (see FIG. 1). As a result, under these synthesis conditions a clear, uniform, homogeneous mixture forms and remains so throughout the entire procedure.

The polymers which may be isolated from the reaction mixture form aqueous solutions which are very effective viscosifiers of water or brine, having molecular weight such that their intrinsic viscosities are high enough for effective viscosification, typically greater than 0.1 dl/g.

It should be noted that the starting polymer is a rigid rod polymer produced by the DuPont Company called Kevlar. This material is useful as a high modulus/high tensile strength fiber in a large number of applications. Incidentally, Kevlar is soluble only in sulfuric acid which prevents facile modification of its chemical structure. The approach presented in FIG. 1 overcomes these problems however. The solvent used in this instance is dimethylfulxodide (DMSO) in which sodium hydride (NaH) and the Kevlar is added. Subsequent reaction with a sultone which undergoes a ring opening and neutralization with a base results in the final polymer product via classical nonsolvent isolation procedures.

The water soluble polymers produced in this invention are characterized by the formula as depicted in FIG. 1. The level of sulfonation is directly proportional to the level of butane sultone (or other alkyl sultones) added to the rigid-rod chain structure.

DETAILED DESCRIPTION OF THE INVENTION

Figure 1:
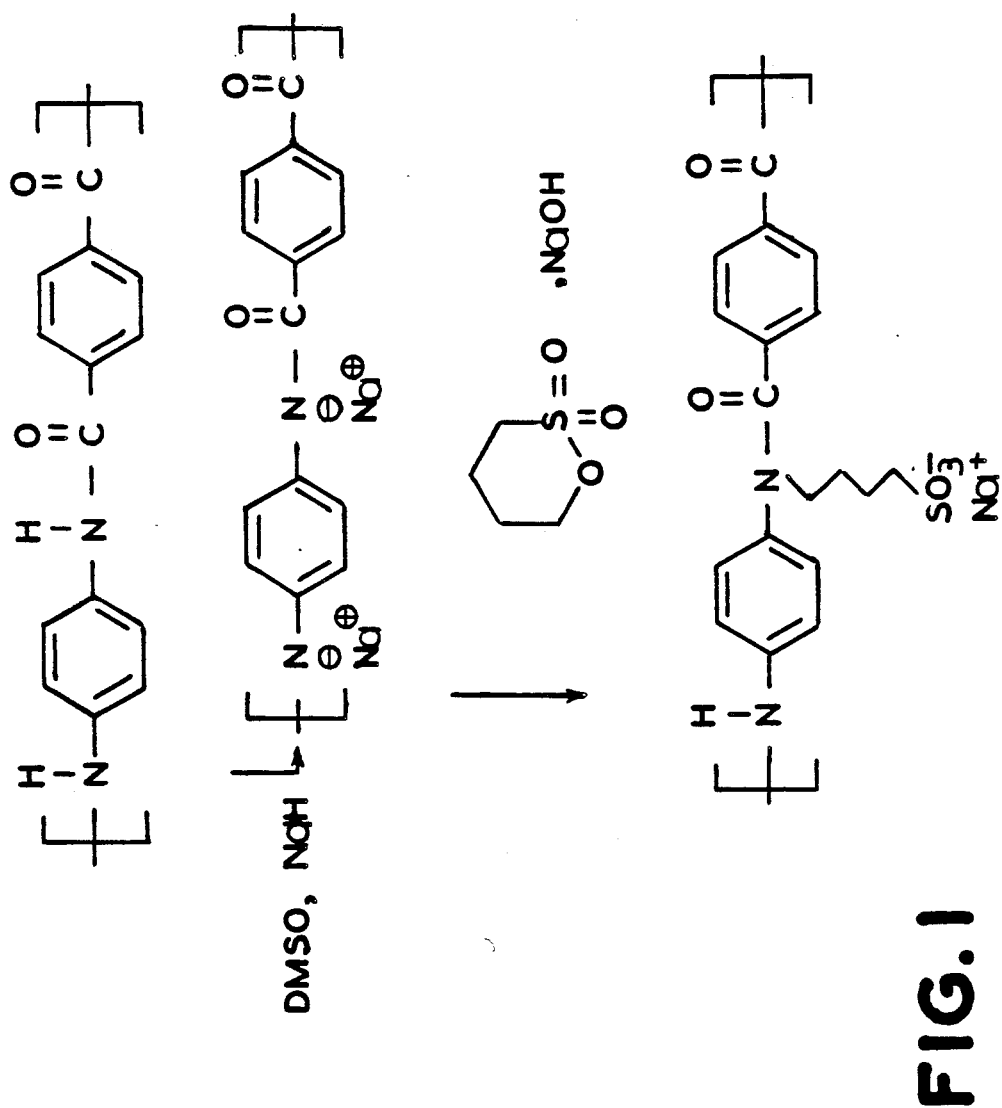
FIG. 1 illustrates in a schematic fashion, the synthetic route to the production of the water soluble rigid rod polymers. (DMSO is dimethylsulfoxide).

The scope of this invention permits the synthesis of a large variety of water soluble rod-like polymers based on a polyamide structure. Typical structures for the polymer in this invention includes aromatic based polyamides, both substituted and unsubstituted, in which the hydrogen atom on the amide linkage is substituted with a sulfonate-containing moiety. In this invention, the sulfonation procedure is accomplished with alkyl sultones, primarily, propane sultone and butane sultone. The synthesis relies on the reaction and subsequent reaction of the sultone with the derivatized rod-like polyamide. These anionic, i.e. sulfonate, derivatives are formed without the utilization of any other sulfonating agents. The reaction mixture is clear, isotropic and homogeneous.

An additional important feature is that the resultant polymer possess both an anionic charge and segments of the rod-like chain that remains unsulfonated. These latter units are insoluble in water and therefore gives a hydrophobic unit to the polymer chain. This is accomplished without the necessity of further chemical posttreatment. The precise level of sulfonation directly permits, therefore, a degree of control of the final polymer structure and, of course, physical properties.

The rod-like polyamides are produced through well-known condensation reaction procedures. Typical polyamide structures that are useful in this instant invention are given in U.S. Pat. Nos. 3,063,966; 3,006,899; 3,943,110; 3,600,350 and 3,673,143.

The water soluble and brine soluble rod-like polymers which are produced by this sulfonation procedure in the instant invention have recurring units of the formula:

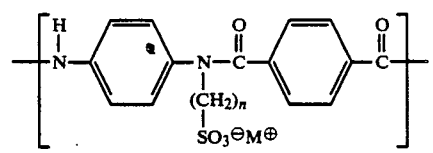

wherein n is preferably 2 to 22 straight chained or branched chained alkyl or cycloalkyl group, more preferably 3 to 12 and most preferably 3 to 8. Typical, but non-limiting examples of preferred alkyl groups are propyl, butyl, octyl, decyl, dodecyl and steryl groups.

The level of sulfonation is preferably about 20 to about 100 mole %, more preferably about 40 to about 95 mole %, and most preferably about 50 to about 90 mole %. M is a tertiary amine or a metal cation selected from the group consisting of aluminum, iron, lead, groups IA, IIA, IB and IIB of the Periodic Table of Elements. The water soluble and brine solution rod-like polymers have a number of average molecular weight $\overline{M}n$ of about $10^3$ to about $10^7$ g/mole, more preferably about $10^3$ to about $10^6$ g/mole, and most preferably about $10^3$ to about $10^5$ g/mole.

The polymeric solution of the instant invention comprises water or water having a salt dissolved therein and about 0.1 to about 90.0 wt. % of the water soluble or brine soluble rod-like polymer, more preferably about 0.5 to about 80.0 wt. % and most preferably about 0.8 to about 70.0 wt. %.

The process for preparing the water soluble and brine soluble rod-like polymers which are characterized by the formula:

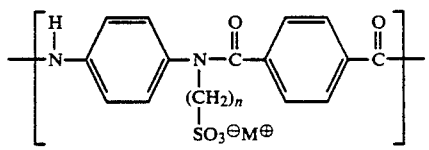

wherein n is a 2 to 22 straight chained or branched chained alkyl or cycloalkyl group, more preferably 3 to 12 and most preferably 3 to 8 and the level of sulfonation is preferably about 20 to about 100 mole %, more preferably about 40 to about 95 mole %, and most preferably about 50 to about 90 mole % and M is a tertiary amine or a metal cation selected from the group consisting of aluminum, iron, lead, Groups IA, IIA, IB and IIB of the Periodic Table of Elements, comprises the step of dissolving about 1.0 to about 40.0 wt. % of an aromatic polyamide in dimethyl sulfoxide, more preferably about 5.0 to about 30.0 wt. %, and most preferably about 10 to about 20.0 wt. % and adding an amount of NaH into said dimethyl sulfoxide which is an equimolar amount to the aromatic polyamide, wherein the aromatic polyamide is characterized by the formula:

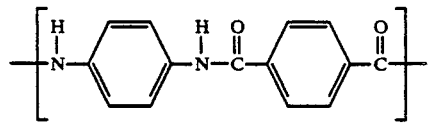

and then stirring the solution of dimethyl sulfoxide, NaH and aromatic amide at about 25° to about 80° C. for a sufficient period of time to a homogenous solution of an intermediate is formed, wherein the intermediate is characterized by the formula:

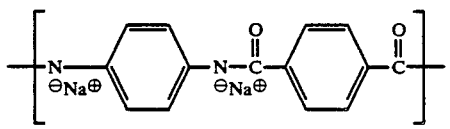

and then adding to the homogenous solution of the intermediate about 0.1 to about 100 mole % of alkyl sultone and about 0.1 to about 100 mole % of sodium hydroxide, the alkyl sultone reacting with the intermediate to form the water soluble rod-like polymers. The rod like polymers can be isolated from the solution by conventional means such as non-solvent precipitation, evaporation or steam stripping. Preferred alkyl sultones which are employed in the instant process are propane sultone or butane sultone.

DESCRIPTION OF THE PREFERRED EMBODIMENT

Example 1

Typical Synthesis Technique

A 200 ml, four-necked, separable flask equipped with condenser, drying tube, nitrogen inlet, dropping funnel, and stirrer was used. The apparatus was swept by dry nitrogen. A 0.025 mole (1.2 g) portion of purified sodium hydride (50 % suspension in paraffin) and 150 mol of DMSO were place in the flask at 303° K. The temperature rose to 343 K after 20 minutes, and the mixture was maintained at 343°–348° K. under nitrogen with stirring. About 120 minutes was required for the sodium hydride to be consumed completely. a 0.025 mole amide unit (3.0 g) of Kevlar was added at 303° K. to the reaction mixture which was cooled, and stirring was continued at 303° K. for 4 hours. Then, 0.025 mole (butane sultone) was added and the mixture stirred at 303° K. for 16 hours. The polymer was precipitated in a large excess of water, filtered, and washed several times with water and acetone alternately. After the isolated product was dried at 373° K. for 10 hours in a vacuum oven, the light yellow powder of the product was obtained with a yield of 3.9 g (96%). The sulfonated product is neutralized with sodium hydroxide via well known neutralization techniques.

Example 2

Polymer Composition

Figure 2:
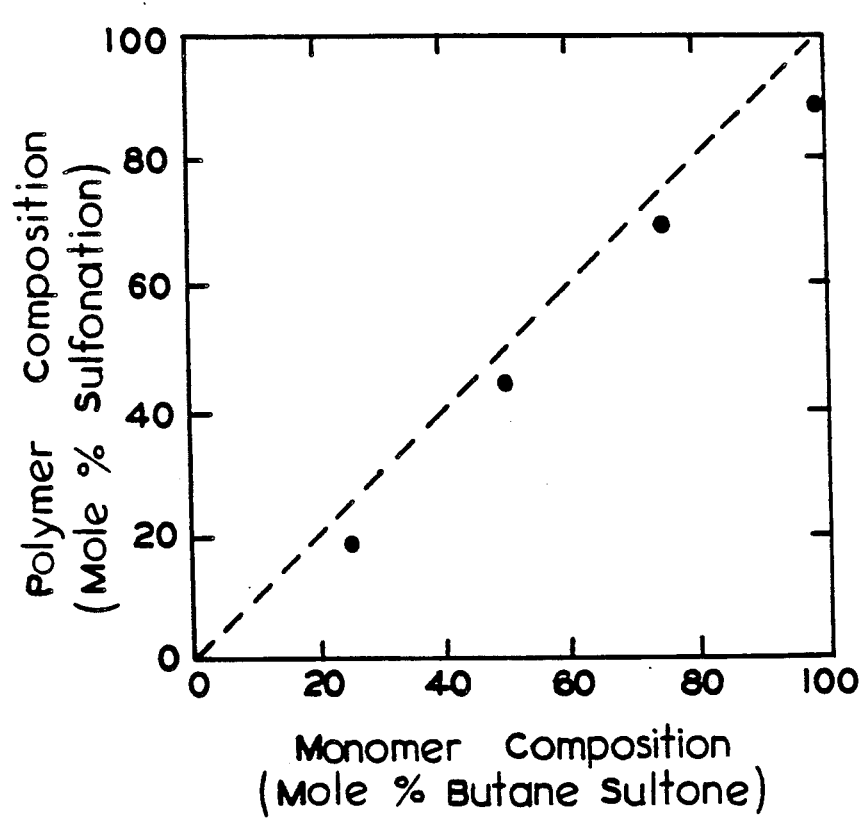
FIG. 2 illustrates the sultone, i.e., butane sultone, feed composition prior to reaction as a function of the incorporation of the sultone, i.e., in terms of sulfonation level, within the aromatic polyamide structure.

Shown in FIG. 2 is the polymer composition-butane sultone feed level as determined by Dietert sulfur analysis. The data clearly confirms:

1. broad range of sulfonation levels are attained.
2. a 1:1 feed-composition is found (to a first approximation).
3. physical properties of the polymer is controlable through sulfonation level changes.
4. solubility of these polymers is directly related to the sulfonated level, for example, water solubility occurs at levels greater than about 40 mole %.

Example 3

Figure 3:
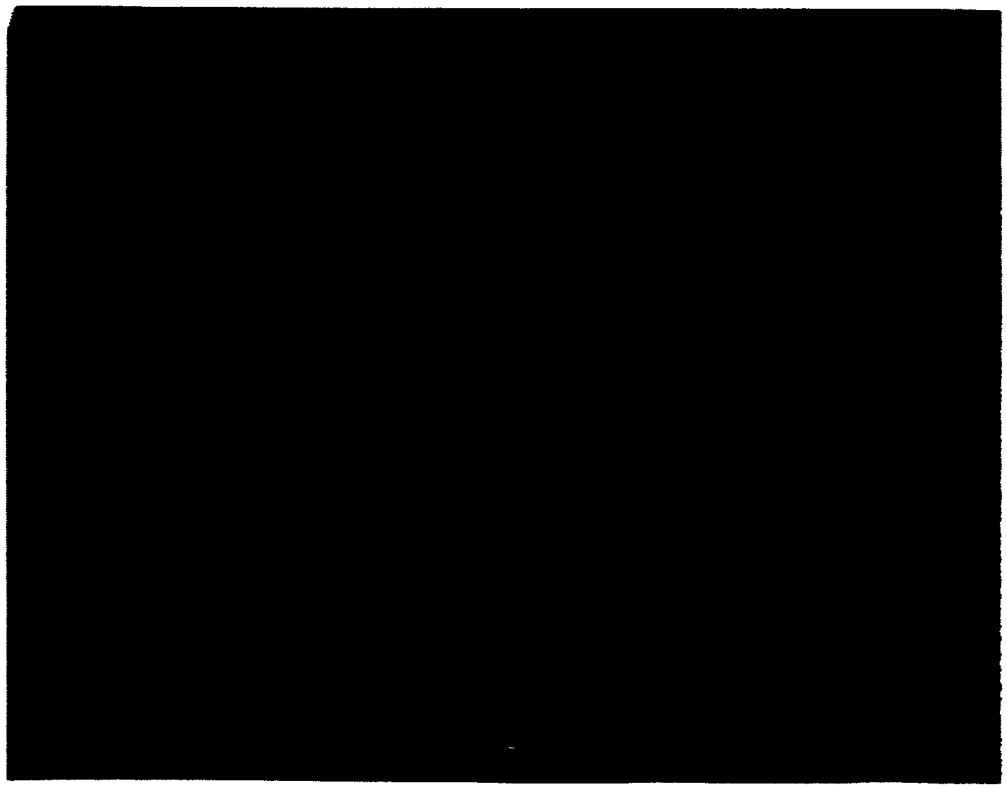
FIGS. 3 and 4 illustrate via a comparison of photomicrographs (40X) of two equivalently sulfonated polymers. The flexible polymer (FIG. 3) shows no birefringence within the dried film, while marked birefringence is found in the rigid rod polymers (FIG. 4).
Figure 4:
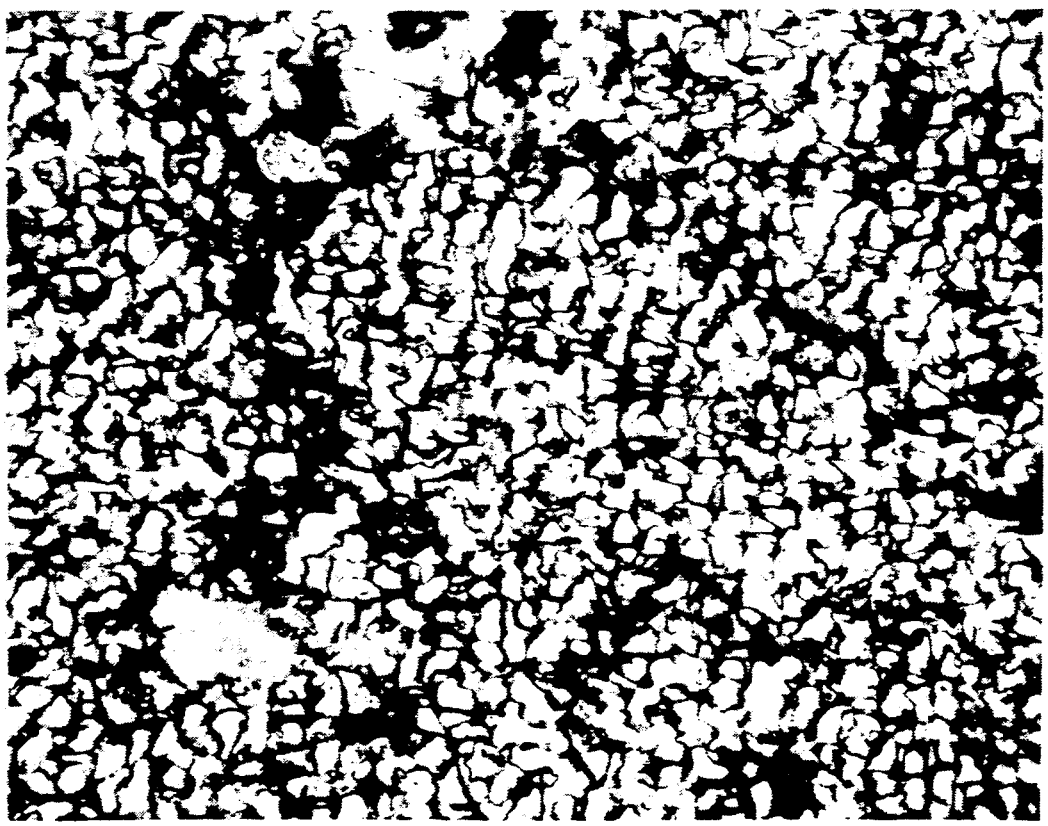

FIG. 3 shows photomicrograph of a flexible chain water soluble polymer and FIG. 4 shows a photomicrography of a rigid-rod water soluble polymer at comparable sulfonation levels. It is immediately observed that no birefringence, i.e., chain ordering, is noted, for the flexible chain while marked birefringence is observed with the rod-like chains. This result strongly confirms that the stiffness of the rod-like structure is preserved over the complete sulfonation level. These rod-like polymers also preserve their structure in solution as anticipated.

Example 4

Typical Rheological Results (Summary)

Figure 5:
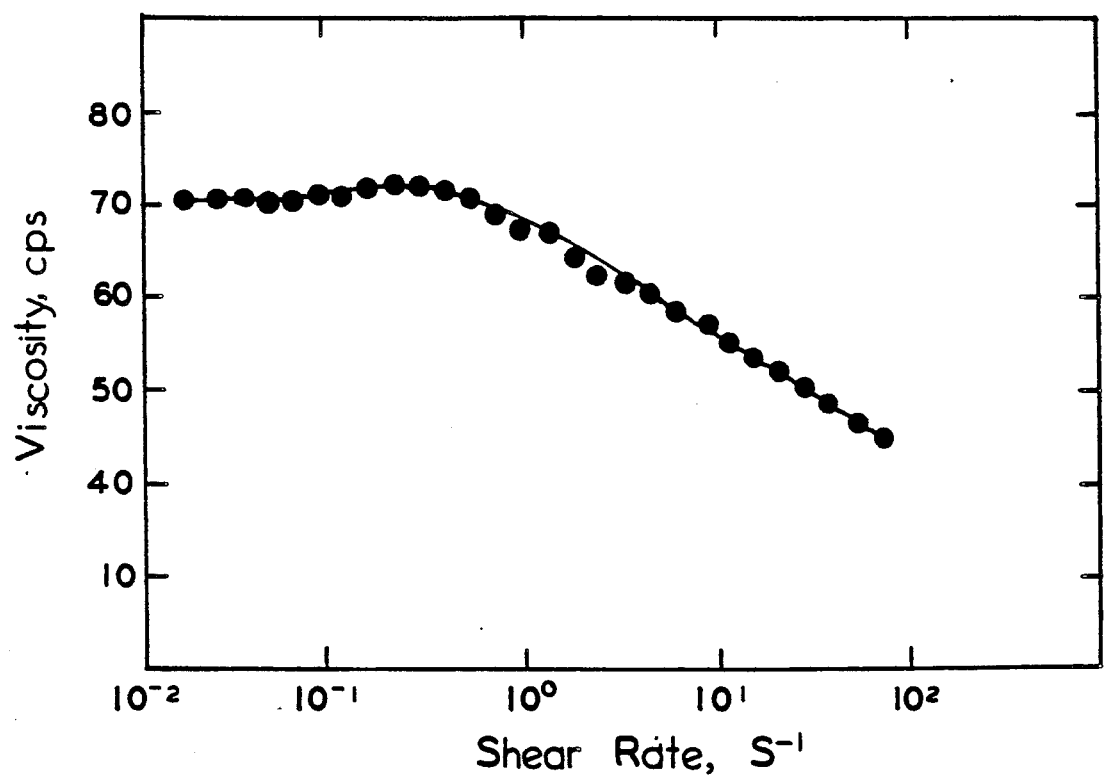
FIG. 5 illustrates the viscosity—shear rate dependence of a water soluble rigid rod.

FIG. 5 confirms:
1. Sulfonated Kevlar is wholly water soluble.

2. Soluble polymers are effective viscosifiers in aqueous media.
3. Shear thinning characteristics are observed over a broad shear rate regime.

Example 5

Figure 6:
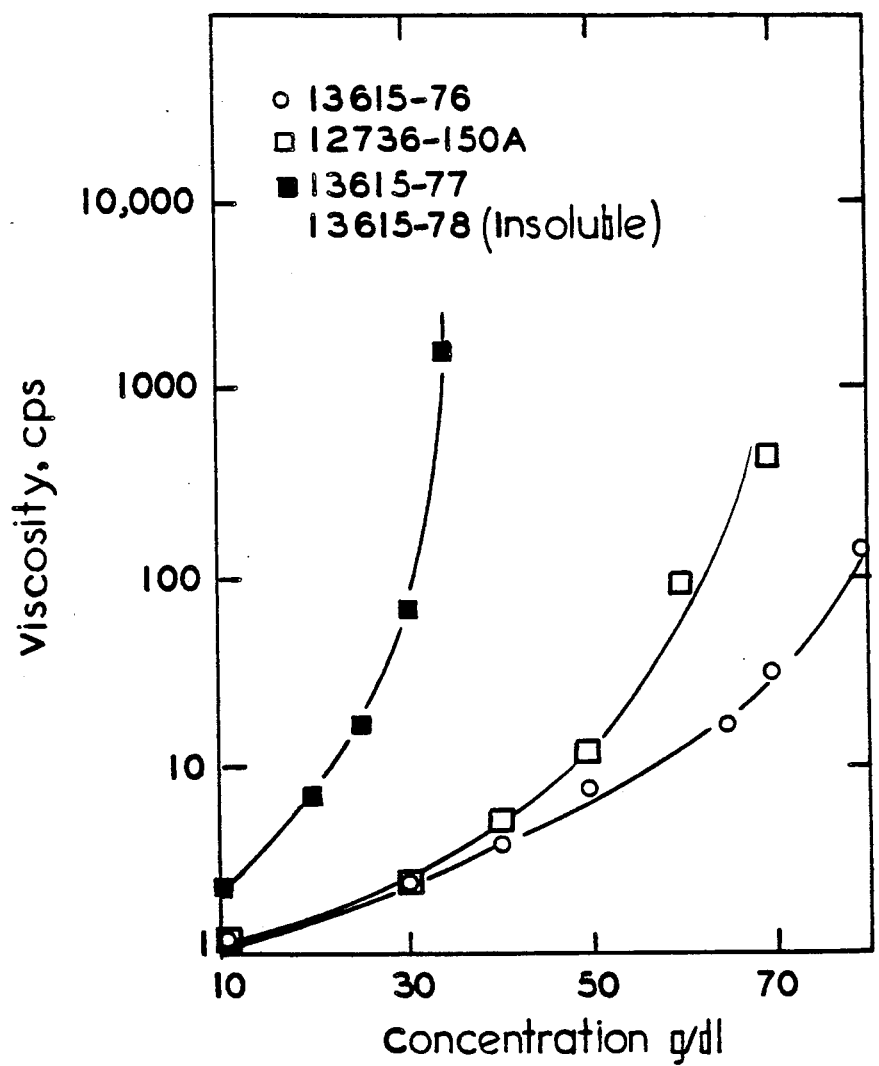
FIG. 6 illustrates the viscosity—concentration profiles of a number of sulfonated rigid rods in a fresh water solution. Note that these polymers were functionalized from the identical starting material.

FIG. 6 shows:
1. The lowest sulfonation level produces the most viscous solution and vice versa.
2. Increases in polymer concentration markedly increases viscosification efficiency.
3. Insolubility occurs at sulfonation levels <40 mole %.
4. Hydrophobic interactions controls rheological properties especially at low sulfonation levels.

Example 6

Salt Dependence

Figure 7:
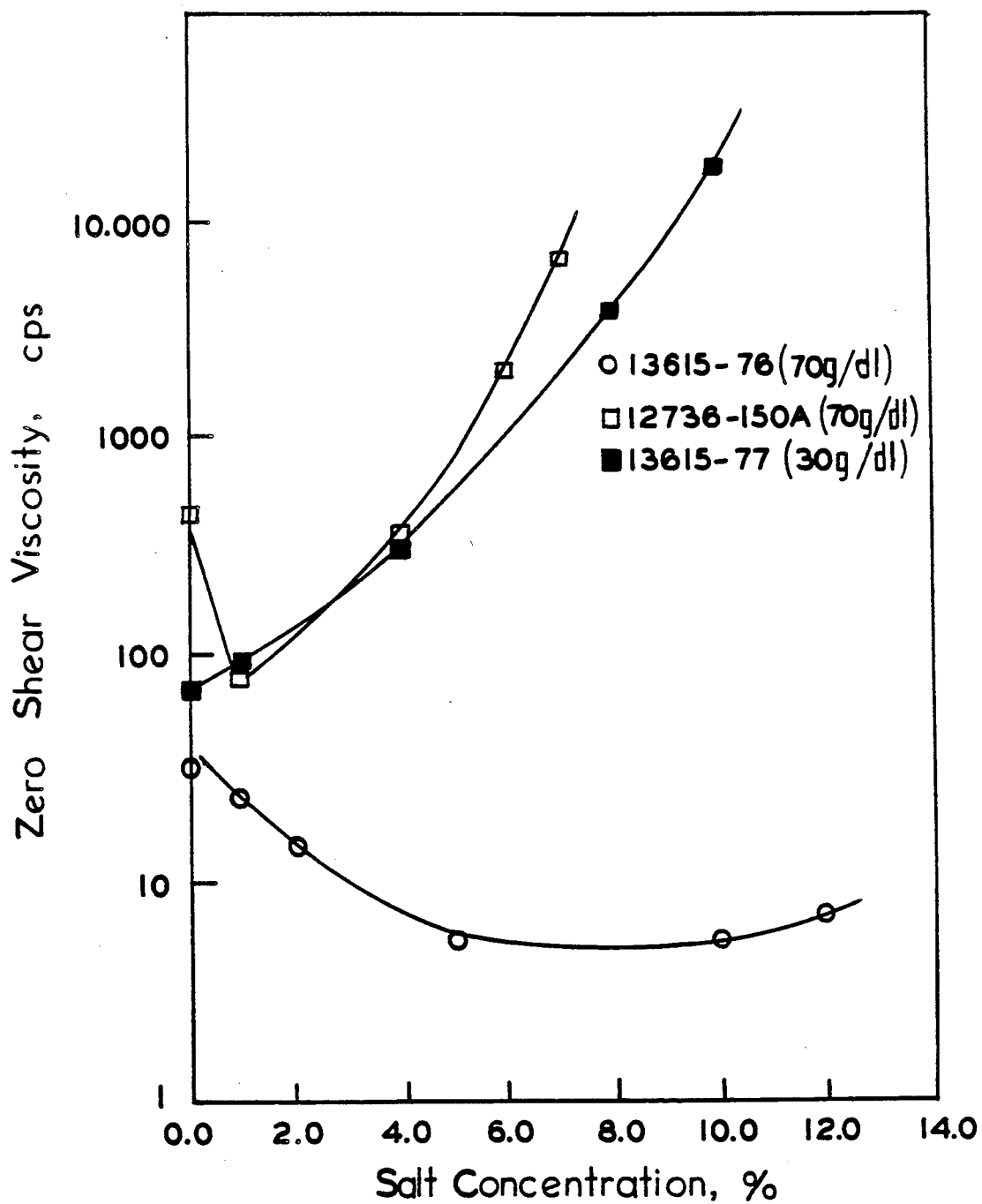
FIG. 7 illustrates the zero shear viscosity as a function of salt (NaCl) concentration of a number of sulfonated rigid rods.

FIG. 7 shows the viscosity-salt concentration dependence of several of the sulfonated rod-like polymers in solution. Briefly, the data shows the following important points.
1. The higher the sulfonation level, the lower is the magnitude of the viscosity as the salt level is increased.
2. Polymer insolubility is not observed over a broad salt range.

Example 7

Thermal Stability

Figure 8:
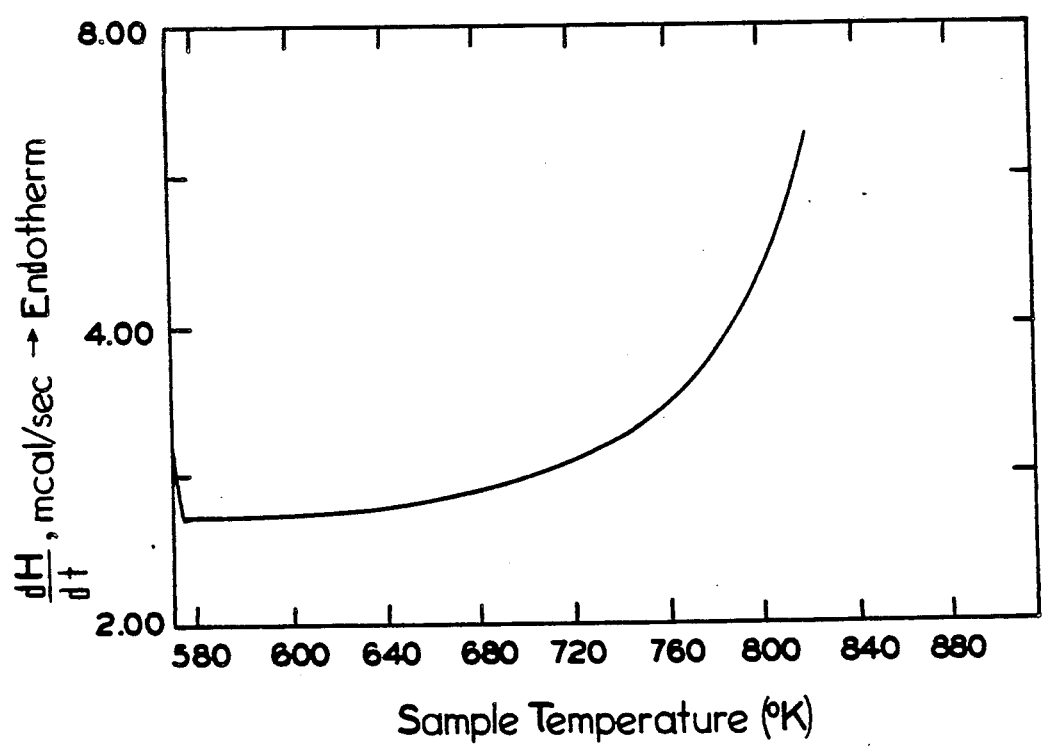
FIG. 8 illustrates differential scanning calorimetry scan of the unfunctionalized rigid rod polymer.
Figure 9:
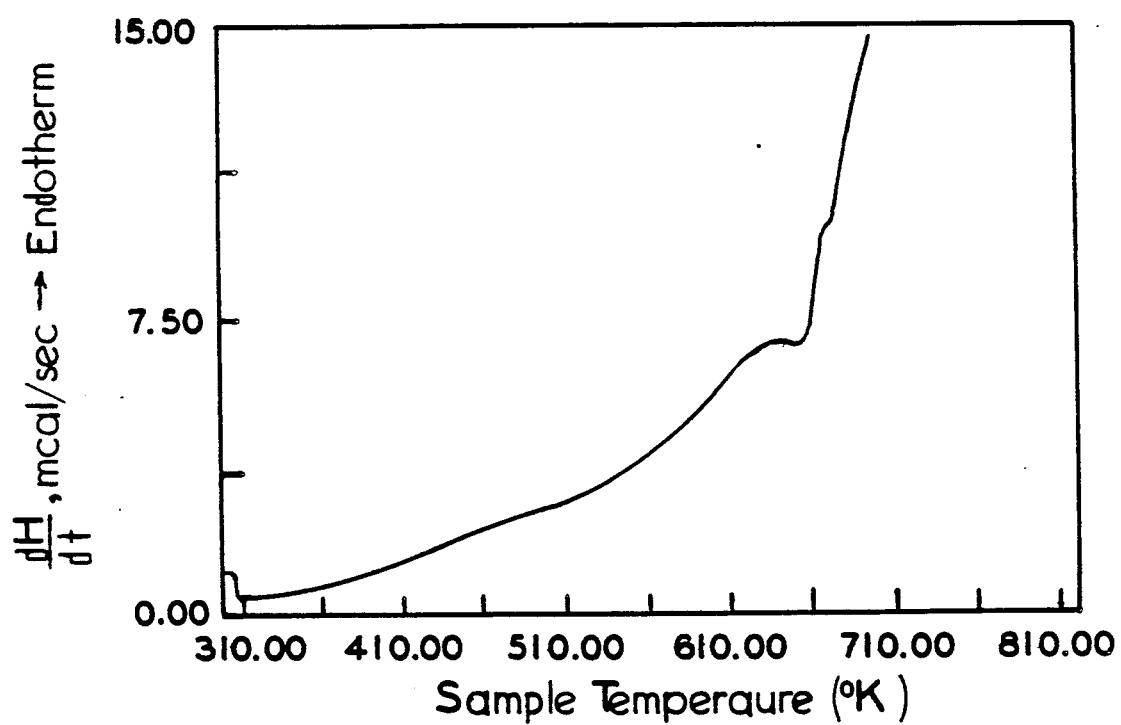
FIG. 9 illustrates differential scanning calorimetry scan of a sulfonated rigid rod polymer.

FIGS. 8 and 9 shows the thermal behavior of the as received Kevlar and a sulfonated version (50 mole %) respectively. As anticipated, the Kevlar material begins to soften around 760° K. This data parallels quite nicely, the well known thermal stability of these materials. Interestingly, the thermal stability of the sulfonated polymers begin to soften around 610° K.—a unique property of these water soluble polymers.

In summary, the use of these novel sulfonate, i.e., anionic, copolymer compositions to impart improved rheological properties to fresh and high brine fluids is described. The properties of the aqueous fluids containing these rod-like polymers can be varied over a broad range due to the ability to readily change a number of compositional variables in the polymer structure, i.e., level of sulfonation and/or molecular weight.

The rod-like polymers are useful as rheological control agents in a variety of oil and gas drilling operations. Included in this category are a variety of well control and workover fluids, fracturing fluids, gelation agents, brine viscosifiers, completion fluids, drag reduction additive, enhanced oil recovery additive and the like.

What is claimed is:

1. A water soluble and brine soluble rod-like polymer consisting essentially of recurring units of the formula:

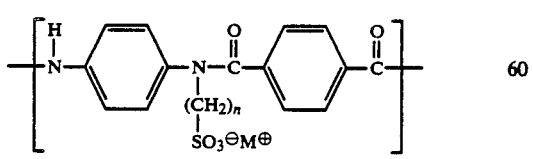

wherein n is a 2 to 22 weight chained or branched chained alkyl or cycloalkyl group and the level of sulfonation is about 20 to about 100 mole %, and M is a tertiary amine or a metal cation selected from the group consisting of aluminum, iron, lead, Groups IA, IIA, IB and IIB of the Periodic Table of Elements.

2. A polymer according to claim 1, wherein n is about 3 to 12.

3. A polymer according to claim 1, wherein n is about 3 to about 8.

4. A polymeric solution comprising
   (a) water; and
   (b) about 0.1 to about 90.0 wt. % of a water soluble and brine soluble rod-like polymer which consists essentially of recurring units of the formula:

wherein n is a 2 to 22 straight chained or branched chained alkyl or cycloalkyl group and the level of sulfonation is about 20 to about 100 mole %, and M is a tertiary amine or a metal cation selected from the group consisting of aluminum, iron, lead, Groups IA, IIA, IB and IIB of the Periodic Table of Elements.

5. A polymeric solution according to claim 4 wherein n is about 3 to about 12.

6. A polymeric solution according to claim 4 wherein n is about 3 to about 8.

7. A polymeric solution according to claim 4 wherein a concentration of said rod-like polymer is about 0.8 to 70 wt. %.

8. A process for preparing a water soluble and brine soluble rod-like polymer which consists essentially of recurring units of the formula:

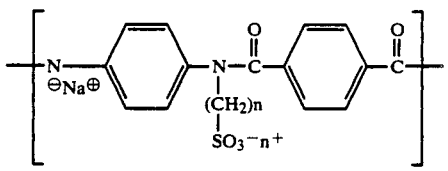

which comprises the steps of:
(a) dissolving about 1.0 to about 40.0 wt. % of an aromatic polyamide in dimethyl sulfoxide and adding an amount of NaH into said dimethyl sulfoxide which is an equimolar amount to said aromatic polyamide, said aromatic polyamide being characterized by the formula:

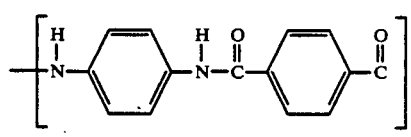

and stirring the solution of dimethyl sulfoxide, NaH and aromatic polyamide at about 25° to about 80° C. to form a homogenous solution of an intermediate, said intermediate being characterized by the formula:

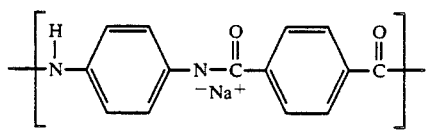

wherein n is a 2 to 22 straight chained or branched chained alkyl or cycloalkyl group and the level of sulfonation is about 20 to about 100 mole %, and M is a tertiary amine or a metal cation selected from the group consisting of aluminum, iron, lead, Groups IA, IIA, IB and IIB of the Periodic Table of Elements, (b) adding to said homogenous solution an alkyl sultone, said alkyl sultone reacting with said intermediate to form said water soluble rod-like polymers.

9. A process according to claim 8 wherein said alkyl sultone is propane sultone or butane sultone.

10. A process according to claim 8 wherein n is about 3 to about 12.

11. A process according to claim 8 wherein n is about 3 to about 8.

12. A process according to claim 8 further including the steps of isolating said water soluble rod-like polymer from said solution.

* * * * *